US006080803A

United States Patent [19]

Claassen et al.

[11] Patent Number: 6,080,803

[45] Date of Patent: Jun. 27, 2000

[54] PREPARING COARSE POLYMER DISPERSIONS

[75] Inventors: Peter Claassen; Gerhard Blatz, both of Ludwigshafen, Germany

[73] Assignee: BASF Aktiengesellschaft, Ludwigshafen, Germany

[21] Appl. No.: 09/195,225

[22] Filed: Nov. 18, 1998

[30] Foreign Application Priority Data

Nov. 19, 1997 [DE] Germany ........................... 197 51 332

[51] Int. Cl.[7] ........................................ C08J 3/02

[52] U.S. Cl. ........................................ 523/335

[58] Field of Search ........................................ 523/335

[56] References Cited

U.S. PATENT DOCUMENTS

| | | | |
|---|---|---|---|
| 3,328,172 | 6/1967 | Smith . | |
| 3,573,246 | 3/1971 | Bennett . | |
| 3,989,661 | 11/1976 | Bondy | 260/29.7 |
| 4,014,843 | 3/1977 | Xanthopoulo | 260/29.7 |
| 4,082,714 | 4/1978 | Scalzo | 260/29.7 |
| 4,150,004 | 4/1979 | Schlueter | 260/23.7 |
| 4,792,490 | 12/1988 | Yasui | 428/407 |
| 4,870,112 | 9/1989 | Knipp | 521/70 |
| 4,874,841 | 10/1989 | Sugimori | 528/491 |
| 4,997,911 | 3/1991 | Yasui | 528/496 |
| 5,143,971 | 9/1992 | Stanislawczyk | 524/833 |
| 5,187,221 | 2/1993 | Schluter | 524/461 |
| 5,442,012 | 8/1995 | Kempner | 525/71 |
| 5,955,540 | 9/1999 | Dion | 525/71 |

FOREIGN PATENT DOCUMENTS

| | | |
|---|---|---|
| 0 536 597 | 4/1993 | European Pat. Off. . |
| 939151 | 10/1963 | United Kingdom . |
| 959755 | 6/1964 | United Kingdom . |

OTHER PUBLICATIONS

Von W. Scholtan, et al., Kolloid–Z. and Z. Polymer, vol. 250, No. 8, pp. 782–796, “Bestimmung Der Teilchengroessenverteilung Von Latices Mit Der Ultrazentrifuge”, 1972.

W. Maechtee, Die Angewandte Makromolekulare Chemie, vol. 162, pp. 35–52, “Coupling Particle Size Distribution Technique”, 1988.

E. W. Madge, Maclaren & Sons, p. 7, “Latex Foam Rubber”, 1962.

W. Maechtle, Makromol. Chem., vol. 185, pp. 1025–1039, “Charakterisierung Von Dispersionen Durch Gekoppelte $H_2O/D_2O$–Ultrazentrifugenmessungen[4]) ”, 1984.

*Primary Examiner*—Paul R. Michl

*Attorney, Agent, or Firm*—Oblon, Spivak, McClelland, Maier & Neustadt, P.C.

[57] ABSTRACT

In a process for preparing coarse polymer dispersions Pg where a mixture M comprising at least one conjugated diene monomer A and at least one ethylenically unsaturated comonomer B is polymerized by free-radical aqueous emulsion polymerization in the presence of an emulsifier E and with or without further additives to form a fine polymer dispersion Pf and said fine polymer dispersion Pf is agglomerated to form a coarse such dispersion Pg, the agglomeration is carried out using a combination of chemical agglomeration and pressure agglomeration; the invention also relates to such coarse polymer dispersions and their use.

19 Claims, No Drawings

PREPARING COARSE POLYMER DISPERSIONS

The present invention relates to a process for preparing coarse polymer dispersions, where a fine polymer dispersion obtainable by free-radical aqueous emulsion polymerization is agglomerated to coarsen it. The invention also relates to the agglomerated polymer dispersions obtainable by this process and to their use for producing latex foams.

Owing to their special product properties, latex foams have found broad application, for example, as molding foams for upholstery materials in the furniture and automotive industries, as carpeting foams for the coating of carpet backings, and also, increasingly, as cosmetic foams. Such latex foams are generally produced using an aqueous polymer dispersion based on a diene monomer, especially butadiene. In order to produce stable foams having good product properties, these dispersions must be of high solids content but comparatively low viscosity. In order to achieve this it is necessary for the latex particles in such dispersions to be relatively large and for their size distributions to be relatively broad. Since diene monomers such as butadiene, however, are relatively unreactive and slow to polymerize, highly concentrated aqueous butadiene dispersions with a solids content of at least about 60% by weight cannot be prepared by direct emulsion polymerization. Therefore, it is normal first to prepare fine polymer dispersions, having a relatively low solids content and a particle size in the range from about 30 to 100 nm, and then, by agglomeration, to convert such dispersions into coarse dispersions having a broad particle size distribution. These coarse dispersions can then be concentrated additionally, if desired, by removing water.

Known techniques for agglomerating polymer dispersions include pressure, freeze and chemical agglomeration. In freeze agglomeration, the dispersions are frozen in layers, producing a partial colloidal instability which leads to clustering of the latex particles, and are subsequently thawed. U.S. Pat. No. 3,238,172 describes a process for preparing strengthened, butadiene-based lattices where a resin dispersion having a refractive index (20° C., Na D line) of less than 1.5900 and a glass transition temperature that is above room temperature is added to an aqueous polymer dispersion with a butadiene content of at least 51% by weight, and this mixture is then subjected to freeze agglomeration. This process, however, is highly complex technically, entails high energy costs and is unsuitable especially for lattices of inadequate stability.

In the case of chemical agglomeration, an agglomerant is added to the fine polymer dispersions in order to initiate a process of controlled agglomeration. GB-A-959 755 describes a technique for chemically agglomerating aqueous lattices based on vinylidene monomers, in which the agglomerants employed are crosslinked polyurethanes. GB-A-939 151 describes a process for preparing synthetic rubber dispersions of low viscosity and high solids content, where a homopolymer of, or copolymer based on, a diene monomer is concentrated in the presence of from 0.01 to 2% of a polyalkylene oxide having a molecular weight of between 3000 and 30,000.

U.S. Pat. No. 3,573,246 describes a method of raising the average particle size of a synthetic rubber latex by pressure agglomeration as it flows through a zone of restriction. In this case the aglomeration is preceded by the addition of a polystyrene latex or silica as strengthening agent. The resin dispersions that are employed as strengthening agents are compatible with the latex dispersions to be agglomerated and, like the silica, act not as chemical agglomerants but solely to achieve greater hardness and compressive strength in the moldings that are produced from the resulting latex foams.

A disadvantage of the processes described above is that it is extremely complex to control the process in order to obtain a defined quality profile in the agglomerated coarse polymer dispersions and in the latex foam end product. For instance, latex foams that are employed in cosmetics are generally required to have high oil and fat resistance and to exhibit low shrinkage. These properties are achieved using, for example, aqueous polymer dispersions based on butadiene-acrylonitrile copolymers in order to prepare cosmetic foams, and these dispersions require agglomeration beforehand. However, they are generally too unstable for simple pressure or freeze homoagglomeration. In the case of pressure agglomeration, either it is impossible to obtain the desired high solids content, or coagulum is formed. A disadvantage of the simple chemical agglomeration of these dispersions is that they have to be subjected to controlled destabilization by reducing the pH, and agglomerated by adding agglomerants, generally with an increase in temperature. Harmonizing the reduction in pH and increase in temperature is tricky, and again there is the risk that coagulum will be formed. This risk, and the associated laborious trialing—in the course of scaling-up, for example—of the appropriate reaction conditions, which is consumptive of both material and time, has a negative impact on the economics of the process.

It is an object of the present invention to provide a process for preparing coarse polymer dispersions in which the risk of coagulum formation is lessened.

We have found that this object is achieved by employing a combination of chemical and pressure agglomeration to agglomerate the fine polymer dispersion.

The invention therefore provides a process for preparing coarse polymer dispersions Pg where a mixture M comprising at least one conjugated diene monomer A and at least one ethylenically unsaturated comonomer B is polymerized by free-radical aqueous emulsion polymerization in the presence of an emulsifier E and with or without further additives to form a fine polymer dispersion Pf and said fine polymer dispersion Pf is agglomerated to form a coarse such dispersion Pg, which process comprises employing a combination of chemical agglomeration and pressure agglomeration.

The preparation of the fine polymer dispersions Pf takes place by free-radical aqueous emulsion polymerization in accordance with customary techniques, including feed techniques, semicontinuous feed techniques and batch techniques. Preference is given to the semicontinuous procedure, in which one portion of the monomers in pure or preemulsified form is charged to a reactor, together with the polymerization medium and at least one emulsifier, and this initial charge is prepolymerized with the addition of an initiator. The formation of this prepolymer can take place, if desired, in the presence of a seed latex, preferably of polystyrene. Here, some of the initiator can be included in the initial charge, or all of it can be supplied to the polymerization reactor via a feed port, at the rate at which it is consumed, in order to maintain the polymerization. The initial reaction time required to form the prepolymer can vary within a wide range; for example, from one minute to six hours. Usual times for this initial reaction lie within a range from about 30 minutes to 2 hours.

The remaining portion(s) of the monomer or monomers can be added separately by way of separate feeds partly separately or together. In a preferred embodiment, the remaining monomers are supplied to the reactor together in pre-emulsified form. The polymerization time can likewise vary within wide limits and is from about 30 minutes to 12 hours. Monomer addition may be followed, if desired, by an afterreaction time of in general from about 30 minutes to 12 hours, preferably from 2 to 6 hours.

The polymerization medium may consist either of water alone or of mixtures of water and water-miscible liquids such as methanol, for example. Preferably, water alone is used.

The free-radical aqueous emulsion polymerisation can be carried out under atmospheric, superatmospheric or subatmospheric pressure. Especially when using gaseous monomers such as butadiene, for example, the polymerization can be carried out under superatmospheric pressure.

The polymerization generally takes place at from 0 to 100° C., although higher levels of up to 130° C., for example, are possible. Preferably, however, polymerization in the process of the invention is conducted at from about 10 to 90° C., preferably from about 20 to 80° C.

To prepare the fine polymer dispersions Pf, emulsifiers and/or protective colloids are added to the polymerization batch in an amount of from 0.05 to 15% by weight, preferably from 1 to 10% by weight, based on the monomer amount.

Suitable emulsifiers E are those emulsifiers which are known to the skilled worker and are commonly employed as dispersants in the context of aqueous emulsion polymerization; such emulsifiers are described, for example, in Houben-Weyl, Methoden der organischen Chemie, Volume XIV/1, Makromolekulare Stoffe [Macromolecular substances], Georg-Thieme-Verlag, Stuttgart, 1961, pp. 411–420. Anionic, cationic and nonionic emulsifiers are suitable. Preference is given to using anionic emulsifiers, and especially soaps.

Suitable anionic emulsifiers E are the salts of $C_8$–$C_{18}$ fatty acids with alkali metals, such as Na and K, with ammonium, with volatile amines, such as triethylamine ethanolamine, diethanolamine, triethanolamine and morpholine, etc., and with divalent and trivalent cations, such as calcium, magnesium, aluminum, etc., for example. Examples of further suitable anionic emulsifiers are alkali metal and ammonium salts of alkyl sulfates (alkyl: $C_8$–$C_{22}$), of sulfuric monoesters with ethoxylated alkanols (EO units: 2 to 50, alkyl: $C_{12}$–$C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$–$C_{18}$). Further suitable emulsifiers are given in Houben-Weyl, loc.cit. pp. 192–208).

Preferred emulsifiers E for the process of the invention are the sodium or potassium soaps of palmitic, margaric, stearic, palmitoleic and oleic acid and the resin soaps (resinates), such as the sodium or potassium salts of ricinoleic, abietic and pimaric acid, etc. Potassium oleate is the preferred emulsifier employed.

The emulsifiers that are employed must be compatible with apolar particles and must be able to desorb rapidly. The surface tension of the polymerized, fine dispersions Pf should in general be not more than 50 mN/m, preferably not more than 40 mN/m. In order to obtain sufficient covering of the particles, the amount of soaps employed as emulsifiers is in general from about 1 to 10% by weight, based on the amount of monomers to be polymerized.

The monomer mixture can if desired be polymerized in the presence of electrolytes, such as alkali metal chlorides and sulfates, examples being KCl and $Na_2SO_4$.

Suitable protective colloids are the stable protective colloids customary at the preferably alkaline pH of the dispersions of the invention. A detailed description of protective colloids is given in Houben-Weyl, loc.cit., pp. 411–420. Protective colloids suitable for preparing polymer dispersions Pf are phenol- and naphthalenesulfonic acid-formaldehyde condensates, such as the Tamol® grades from BASF AG, for example. The amount employed is generally from about 0.1 to 2% by weight, based on the overall amount of the monomers to be polymerized. It is preferred to employ polycondensates of naphthalenesulfonic acid and formaldehyde having a number-average molecular weight of about 5000, in the form of an aqueous solution.

In a special embodiment of the process of the invention an emulsifier system is employed which comprises at least one alkali metal or ammonium salt of a saturated or unsaturated $C_8$–$C_{18}$ fatty acid, preferably potassium oleate, and at least one phenolsulfonic and/or naphthalenesulfonic acid-formaldehyde condensate.

Polymerization initiators that can be employed are all compounds which dissociate into free radicals under the conditions of polymerization, examples being peroxides, hydroperoxides, hydrogen peroxide, persulfates, azo compounds and what are known as redox catalysts. Preference is given to the use of water-soluble initiators. In some cases it is advantageous to use mixtures of different polymerization initiators; for example, mixtures of hydrogen peroxide with sodium or potassium peroxodisulfate. Mixtures of hydrogen peroxide and sodium peroxodisulfate can be used in any desired proportion. Organic peroxides likewise suitable as initiators are described in EP-A-0 536 597. Said polymerization initiators are employed in customary amounts of, for example, from 0.01 to 5, preferably from 0.1 to 2.0% by weight, based on the monomers to be polymerized.

It is preferred to employ initiators which are able to initiate the polymerization even at low temperatures such as from about 0 to 50° C., preferably from about 10 to 30° C. For polymerizations, especially at low temperatures, it is preferred to employ redox initiators, which comprise at least one reducing agent and one oxidizing agent. Suitable oxidizing agents in such systems are the abovementioned peroxides and/or hydroperoxides. Preference is given to combined systems, which may also include a small amount of a metal compound that is soluble in the polymerization medium and is able to exist in a plurality of valence states. Suitable redox initiator systems for the process of the invention include as their reducing component, for example, ascorbic acid, glucose, sorbose, an ammonium or alkali metal hydrogen sulfite, sulfite, thiosulfate, hyposulfite, pyrosulfite or sulfide, salts of hydroxymethanesulfinic acid, preferably the sodium salt, obtainable as Rongalit® from BASF AG, acetone bisulfite adducts, etc.

Suitable oxidizing components are hydrogen peroxides, t-butyl hydroperoxide, diisopropyl hydroperoxide, ammonium and/or alkali metal peroxodisulfates etc. Suitable metallic components are water-soluble Fe(II) salts, such as Fe(II) sulfate, silver salts, and combinations of water-soluble Fe/V salts, etc. If the initiator systems employed comprise redox initiators, the amount of the reducing component is generally from about $3\times10^{-6}$ to 1 mol-% and that of the oxidizing component generally from about 0.001 to 5.0 mol-%, based on the amount of the monomers employed in the polymerization.

The monomer mixture M used to prepare the polymer dispersions Pf generally comprises from 50 to 80% by weight, preferably from 55 to 75% by weight and, in particular, from 62 to 70% by weight, especially 67% by weight, of at least one free-radically polymerizable diene monomer A (principal monomer) and from 20 to 50% by weight, preferably from 25 to 45% by weight, and in particular, from 30 to 38% by weight, especially 33% by weight, of at least one comonomer B.

Suitable diene monomers A are butadiene, isoprene, chloroprene and mixtures thereof.

Butadiene is employed with particular preference as diene monomer A.

Suitable ethylenically unsaturated comonomers B are vinylaromatic compounds, such as styrene, α-methylstyrene, o-chlorostyrene or vinyltoluene, α,β-ethylenically unsaturated nitriles, such as acrylonitrile and methacrylonitrile, for example, and mixtures thereof.

In a preferred embodiment of the process of the invention the monomer mixture M for preparing the polymer dispersions Pf includes butadiene as diene monomer A and a comonomer B selected from styrene, acrylonitrile and mixtures thereof.

If desired, the monomer mixture M can be polymerized in the presence of customary polymerization regulators. In this case these regulators are used in an amount of from about 0.01 to 5% by weight, based on the overall amount of the monomers to be polymerized.

Suitable regulators are compounds which when used in polymerizations limit the molecular weight of the polymers: examples are alcohols, salts of hydrazine and of hydroxylamine, formic acid, alkali metal and ammonium salts of formic acid, organic compounds containing sulfur in bonded form, such as organic sulfides, disulfides, polysulfides, sulfoxides, sulfones and mercapto compounds, ammonia and amino compounds, or mixtures thereof. Specific examples of polymerization regulators are di-n-butyl sulfide, di-n-octyl sulfide, diphenyl sulfide, thiodiglycol, ethylthioethanol, diisopropyl disulfide, di-n-butyl disulfide, di-n-hexyldisulfide, diacetyl disulfide, diethanol sulfide, di-t-butyl trisulfide and dimethyl sulfoxide, ethanolamine, diethanolamine, triethanolamine, triethylamine, morpholine and piperidine. Preferred polymerization regulators used are mercapto compounds, dialkyl sulfides and/or diaryl sulfides. Examples of these compounds are ethyl thioglycolate, cysteine, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioglycerol, thioacetic acid, thiourea and alkyl mercaptans, such as n-butyl mercaptan, n-hexyl mercaptan, n-dodecyl mercaptan or tert-dodecyl mercaptan. In the process of the invention it is preferred to employ the last mentioned alkyl mercaptans, and especially tert-dodecyl mercaptan.

A chain-terminating reagent may be added if desired to the polymerization batch in order to limit the maximum degree of conversion. In contrast to the regulators, the compounds employed as chain-terminating reagents are those whose free radicals are so slow to react that in general it is impossible for any further chain reaction to begin. Examples of such reagents include alkylphenols, amines, such as diethylhydroxylamine, sulfites, disulfites, etc.

The abovementioned additives and further customary additives can be added to the polymer dispersions Pf by way of the initial charge, one of the feed streams, or after the end of polymerization. For instance, the pH of the dispersion can be adjusted, if desired, by means of acids or, preferably, bases, examples being alkali metal hydroxides, alkali metal carbonates, alkali metal phosphates, alkali metal acetates, ammonia, etc. Examples of further suitable additives are reducing agents and bleaching agents, such as the alkali metal salts of hydroxymethanesulfinic acid (eg. Rongalit® from BASF AG).

The pH of the fine polymer dispersions Pf is preferably in the alkaline—for example, from about 9 to 12—and as described below is lowered prior to agglomeration.

The residual monomer content of the dispersions can be reduced by customary methods, preferably steam stripping. The methods employed should not lead to additional polymerization or cross-linking.

The particle size distribution in the polymer dispersions Pf obtained by the process of the invention is, in general, relatively narrow. The LT (light transmittance relative to water) is generally from about 55 to 98%, preferably from 60 to 95% and, in particular, from 60 to 80%.

The weight-average particle size as determined using an analytical ultracentrifuge in accordance with the method of W. Scholtan and H. Lange, Kolloid-Z. and Z. Polymere 250 (1972), p. 782–796, (see also W. P. Mächtle, Angewandte makromolekulare Chemie, 162 (1988), 35–42) results in a ponderal median particle diameter $d_{50}$ (particle diameter below which 50% by weight of the particles fall) of from about 60 to 180 nm, preferably from 100 to 130 nm.

The fine polymer dispersions Pf may contain a certain degree of crosslinking. They are found by NMR spectroscopy to have a $T^2$ relaxation time of roughly in general in the range from 1.0 to 6.0 ms, and preferably at least 2.5 ms.

In the process of the invention, the agglomeration of the fine polymer dispersions Pf to coarse polymer dispersions Pg takes place through a combination of chemical and pressure agglomeration. To achieve this, the pH of the fine polymer dispersion Pf is set before agglomeration at from 8.6 to 10, preferably from 8.6 to 9.5, by adding an inorganic acid, such as hydrochloric, sulfuric, phosphoric or nitric acid, an organic acid, such as formic, acetic, propionic, butyric, oxalic, malonic, succinic, adipic or lactic acid, etc., or a mixture thereof. The pH is preferably reduced by adding a dilute aqueous solution of oxalic acid.

Following the reduction in pH a chemical agglomerant is added to the fine polymer dispersions Pf. Suitable chemical agglomerants are generally water-soluble or water-dispersible polymers based on hydrophilic monomers, such as polyacrylamide, polymethacrylamide, polyvinyl esters of $C_1$–$C_{18}$ carboxylic acids, examples being polyvinyl formate, polyvinyl acetate, polyvinyl propionate, polyvinyl n-butyrate, polyvinyl laurate and polyvinyl stearate, polyethers, such as polyalkylene glycols, and mixtures thereof. Polyalkylene glycols which can be employed are polyethylene, polypropylene and polytetramethylene glycols, and also block copolymers of ethylene oxide and propylene oxide. In the process of the invention it is preferred as chemical agglomerants to use polyethylene glycols having a number-average molecular weight in the range from about 10,000 to about 50,000, preferably from about 15,000 to about 40,000 and, in particular, from about 17,000 to about 30,000. This molecular weight range is suitable for all of the abovementioned agglomerants. The amount of chemical agglomerants used is generally from about 0.01 to 5% by weight, preferably from about 0.05 to 3% by weight, based on the solids content of the polymer dispersion Pf plus the agglomerant. The agglomerant can be added in solid form or as a solution in water or in a solvent which is fully miscible with water. Suitable apparatus for mixing the polymer dispersion Pf with the chemical agglomerant is known to the skilled worker and includes, for example, stirred kettles.

The mixture of fine polymer dispersion Pf and chemical agglomerant is subjected to high-pressure agglomeration by forcing it through a homogenizer, such as a valve or a flow restrictor, in the course of which the latex particles agglomerate. The pressures which arise here are within a range from about 100 to 500 bar, preferably from about 200 to 400 bar.

The temperature in the course of agglomeration is generally in a range from about 10 to 70° C., preferably from 20 to 50° C.

The coarse polymer dispersions Pg that are obtained following agglomeration can if desired be subjected to conventional concentration by means, for example, of thin-film evaporation until they reach the solids content required for subsequent processing into foams. In carrying out this concentration process, there is a certain viscosity level, acceptable for further processing, which should generally not be exceeded. The coarse polymer dispersions Pg obtained by the process of the invention generally have an LT in the range from 5 to 50%, preferably from 10 to 45%. Their visocisty is generally within a range from about 900 to 2500 mPa*s, preferably from about 1000 to 2000 mpa*s, measured in accordance with Brookfield. The surface tension is within a range from about 27 to 45 mN/m. Following their concentration, the coarse polymer dispersions Pg obtained by the process of the invention have a solids content of generally at least 55% by weight and preferably at least 60% by weight.

In order to stabilize the dispersions their pH, following agglomeration, can be raised again by adding a base. Examples of suitable bases are alkali metal hydroxides, alkali metal carbonates, alkali metal hydrogencarbonates, ammonia, etc. Following the addition of the base, the pH of the coarse polymer dispersions Pg is in general within a range from about 9.5 to 12.

The process of the invention leads preferably to coarse polymer dispersions with high stability on storage that are essentially free from coagulant. They are suitable for producing low-shrinkage foams.

The present invention also provides the coarse polymer dispersions Pg obtainable by the agglomeration process of the invention.

The coarse polymer dispersions Pg of the invention are suitable equally for all common techniques of producing latex foams. Such techniques are known to the skilled worker and include, for example, the mechanical foaming of the lattices with air or other gaseous propellants and, if desired, their subsequent hot vulcanization. The latex can be compounded for producing foams.

The invention additionally provides a process for producing latex foams which employs the coarse polymer dispersions Pg of the invention. For this purpose, crosslinking or vulcanizing agents are generally added to said dispersions Pg. These agents are known to the skilled worker from, for example, E. W. Madge 'Latex Foam Rubber', Maclaren & Sons, 1962. It is common to use a sulfur-based crosslinking system whose sulfur content is generally from 2 to 3% by weight (dry weight). Accelerators, examples of which are dithiocarbamate, xanthate, thiazole or thiuram, may likewise be added. If desired, zinc oxide is added in amounts from 1 to 10% by weight as an activator at the compounding or foaming stage. Antioxidants and fillers are added if desired.

The usual procedure for producing latex foams involves aerating a rubber latex and shaping and then crosslinking the resulting composition, the shaping step embracing lateral spread as well. Foam rubber according to the invention can thus be prepared both by molding methods, examples of which are the Dunlop and Talalay methods, and by the lateral spread method. These give, for example, a molded foam if the foamed latex is poured into molds and then vulcanized.

Preference is given to the Dunlop mechanical foaming process. A latex mixture, compounded so that it is vulcanizable, is beaten to give a stable foam, referred to as the pre-expanded latex, to a volume which is from about 8 to 12 times that of the original latex mixture. A solution of sensitizing compounds, known as gelling agents, is added to the foam and said foam is introduced into a closable mold. Depending on the amount of sensitizer added the foam remains liquid for about 5 to 10 minutes more before it gels and coagulates. Still in the mold, it is vulcanized by heat treatment with steam or, for example, hot water. Shrinkage of about 5% may occur in the course of subsequent washing and drying.

The process stages of foaming, gelling or curing, drying and crosslinking are known to the skilled worker, as are the materials that may be used for these stages. If gelling agents are used, those of the heat-sensitive or delayed-action type are suitable. Typical and suitable materials of this kind are well known and, like the processes in which they are commonly used, are described in Madge's 'Latex Foam Rubber'. As a rule, delayed-action gelling agents are used in the Dunlop process, whereas heat-sensitive agents are employed in lateral-spread foams and flat rolled materials.

The coarse polymer dispersions Pg of the invention are preferably suitable for producing cosmetic foams. Characteristics of these foams are their high oil and fat resistance and their low shrinkage.

The invention is illustrated by the following, nonlimiting examples.

EXAMPLES

The surface tension (SF) was determined using a ring tensiometer.

The LT (light transmittance) was determined on a 0.1% strength by weight solution in water against the pure solvent as reference.

The ponderal median particle diameter ($d_{50}$) was determined by the method of W. Mächtle, Makromolekulare Chemie 185 (1984) pp. 1025–1039 in an analytical ultracentrifuge (AUC).

To determine the content of coagulum, the dispersion was filtered through a nylon mesh of known weight with a mesh size of 180 μm. The coagulum intercepted was washed with distilled water, dried together with the mesh and weighed. The amount of coagulum is stated in % relative to the mass of the monomers employed.

A) Preparing a Fine Polymer Dispersion

A stirred polymerization pressure-vessel with a volume of 40 l was charged at 60° C. with 400 g of K-oleate (17.4% strength by weight in water), 230 g of a polycondensate of naphthalenesulfonic acid and formaldehyde, having a number-average molecular weight of about 5000 (45% strength by weight in water), 56 g of tetrasodium pyrophosphate, 7 g of the Na salt of ethylenediaminetetraacetic acid and 310 g of a polystyrene seed (34% by weight), having a diameter of 30 nm, in 9800 g of water. Then 20 g of $Na_2S_2O_8$ were added and the feed streams 1 and 2 were supplied continuously over 6 hours in the course of which the polymerization temperature was maintained.

Feed Stream 1:

9380 g of butadiene 4620 g of acrylonitrile 2800 g of K-oleate (17.4% strength by weight in water)

112 g of tert-dodecyl mercaptan 3800 g of water

Feed Stream 2:

7 g of $Na_2S_2O_8$ 300 g of water

The result was a fine polymer dispersion having the physical properties indicated in Table 1.

TABLE 1

| Physical properties | |
|---|---|
| LT (%) | 72 |
| $d_{50}$ (nm) | 120–140 |
| pH | 10 |
| SF (mN/m) | 42 |
| Solids content (%) | 45 |

B) Agglomerating

For agglomeration, the polymer dispersion from A) was adjusted to a pH of 8.8 using aqueous oxalic acid, 0.1% by weight of polyethylene glycol was added, based on the solids content of the polymer dispersion plus agglomerant, and agglomeration was carried out at room temperature under a pressure of 200 bar. The physical data for the agglomerated coarse polymer dispersion are given in Table 2.

TABLE 2

| Physical properties | |
|---|---|
| LT (%) | 40 |
| $d_{50}$ (nm) | 150–180 |
| SF (mN/m) | 34 |
| Solids content (%) | 41 |
| Coagulum formed | none |

The agglomerated dispersion can be concentrated by thin-film evaporation.

Comparative Example (without polyethylene glycol)

For agglomeration, the polymer dispersion from A) was agglomerated as in B) but without adding polyethylene glycol. The physical properties of the agglomerated dispersion are indicated in Table 3.

TABLE 3

| Physical properties | |
|---|---|
| LT (%) | 65 |
| $d_{50}$ (nm) | 120–140 |
| SF (mN/m) | 42 |
| Solids content (%) | 45 |
| Coagulum formed (%) | 80 |

We claim:

1. A process for preparing a coarse polymer dispersion Pg comprising, polymerizing a mixture M comprising at least one conjugated diene monomer A and at least one ethylenically unsaturated comonomer B by free-radical aqueous emulsion polymerization in the presence of an emulsifier E to form a fine polymer dispersion Pf, agglomerating said fine polymer dispersion Pf to form the coarse polymer dispersion Pg;

wherein said process comprises employing a combination of chemical agglomeration and pressure agglomeration.

2. A process as claimed in claim 1, wherein the light transmittance, LT, of the fine polymer dispersion Pf is from 55 to 98%.

3. A process as claimed in claim 1, wherein the ponderal median particle diameter of the fine polymer dispersion Pf, measured as the $d_{50}$ in an analytical ultracentrifuge, is from 60 to 180 nm.

4. A process as claimed in claim 1, wherein the pH of the fine polymer dispersion Pf is set before agglomeration at from 8.6 to 10.

5. A process as claimed in claim 1, wherein chemical agglomeration is carried out using an agglomerant selected from the group consisting of polyvinyl esters of $C_1$–$C_{18}$ carboxylic acids, preferably polyvinyl formate, polyvinyl acetate, polyvinyl propionate, polyvinyl n-butyrate, polyvinyl laurate or polyvinyl stearate, polyacrylic acid, polymethacrylic acid, polyacrylamide, polymethacrylamide, polyalkylene glycols and mixtures thereof.

6. A process as claimed in claim 1, wherein the pressure in the course of pressure agglomeration is from 100 to 500 bar.

7. A process as claimed in claim 1, wherein the diene monomer A is selected from butadiene, isoprene, chloroprene and mixtures thereof.

8. A process as claimed in claim 1, wherein the ethylenically unsaturated comonomer B is selected from $\alpha,\beta$-ethylenically unsaturated nitriles, vinylaromatic compounds and mixtures thereof.

9. A process as claimed in claim 1, wherein the ethylenically unsaturated comonomer B is selected from acrylonitrile, methacrylonitrile, styrene, $\alpha$-methylstyrene, vinyltoluene, and mixtures thereof.

10. A process as claimed in claim 1, wherein the mixture M comprises butadiene as diene monomer A and acrylonitrile, styrene or mixtures thereof as comonomer B.

11. A process as claimed in claim 10, wherein the amount of A is from 50 to 80% by weight based on the overall monomer amount of M.

12. A process as claimed in claim 10, wherein the amount of B is from 20 to 50% by weight based on the overall monomer amount of M.

13. A process as claimed in claim 1, wherein an emulsifier E is employed which comprises at least one alkali metal and/or ammonium salt of a saturated or unsaturated $C_8$–$C_{18}$ fatty acid.

14. A process as claimed in claim 13, wherein the emulsifier E is employed together with at least one protective colloid, preferably phenolsulfonic acid-formaldehyde condensates, naphthalenesulfonic acid-formaldehyde condensates and mixtures thereof.

15. A process as claimed in claim 1, wherein the LT of the coarse polymer dispersion Pg is from 5 to 50%.

16. A process as claimed in claim 1, wherein the solids content of the coarse polymer dispersion Pg is at least 55% by weight.

17. A process for producing latex foams which comprises foaming a coarse polymer dispersion Pg as claimed in claim 16, which may or may not have been compounded with additives, and crosslinking it.

18. The process of claim 1, wherein said mixture further comprises an additive.

19. The process of claim 2, wherein the light transmittance, LT, of the fine polymer dispersion Pf is from 60 to 95%.

* * * * *